(12) United States Patent
Blanton et al.

(10) Patent No.: US 10,594,914 B2
(45) Date of Patent: Mar. 17, 2020

(54) PAINT APPLIED CAMERA SYSTEM

(71) Applicant: The Boeing Company, Chicago, IL (US)

(72) Inventors: Ross Mitchell Blanton, Hazelwood, MO (US); Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 21 days.

(21) Appl. No.: 15/950,084

(22) Filed: Apr. 10, 2018

(65) Prior Publication Data

US 2019/0313000 A1    Oct. 10, 2019

(51) Int. Cl.
*H04N 5/225* (2006.01)
*H04N 7/18* (2006.01)

(52) U.S. Cl.
CPC ......... *H04N 5/2258* (2013.01); *H04N 5/2253* (2013.01); *H04N 7/181* (2013.01)

(58) Field of Classification Search
CPC ..... H04N 5/2258; H04N 5/2253; H04N 7/181
USPC ......................................................... 348/151
See application file for complete search history.

(56) References Cited

U.S. PATENT DOCUMENTS

| 2012/0242621 | A1* | 9/2012 | Brown | H01L 27/14623 345/175 |
| 2015/0303230 | A1* | 10/2015 | Kamino | H01L 27/1461 257/443 |
| 2017/0025761 | A1* | 1/2017 | Kim | H01Q 9/42 |
| 2018/0025200 | A1* | 1/2018 | Frye | G06K 9/0004 257/9 |
| 2018/0341031 | A1* | 11/2018 | Tredwell | H04N 5/32 |

OTHER PUBLICATIONS

Antipa et al., "DiffuserCam: Lensless Single-Exposure 3D Imaging", Optica, Optical Society America, Jan. 2018, vol. 5, No. 1, pp. 1-9.
Asif, et al., "FlatCam: Thin, Lensless Cameras Using Coded Aperture and Computation", IEEE Transactions on Computational Imaging, Sep. 2017, vol. 3, No. 3, 14 pages.
Fatemi et al., "An 8×8 Heterodyne Lens-less OPA Camera", Conference on Lasers and Electro-Optics, 2017, 2 pages.

* cited by examiner

*Primary Examiner* — Jeremiah C Hallenbeck-Huber
(74) *Attorney, Agent, or Firm* — Kolisch Hartwell, P.C.

(57) ABSTRACT

A paint-applied digital imaging system may include a plurality of small pixel devices each including a photodiode, a battery, and an antenna. The plurality of pixel devices may be suspended in a liquid dispersion medium, such as a transparent paint, and brushed or rolled onto an extended surface, such as a wall. Each photodiode collects light, charging its battery, which powers the antenna. The antenna transmits a signal indicating the intensity of light incident on the photodiode to a base station. The signals sent by the plurality of pixel devices are received by the base station and converted into a digital image.

20 Claims, 6 Drawing Sheets

PAINT APPLIED CAMERA SYSTEM

INTRODUCTION

A typical camera includes a lens and a collection of light receptors such as a charge-coupled device (CCD) array. To form an image, light emitted by a scene passes through the lens and impacts the CCD array. The CCD array then measures the amount of light emitted by each portion of the scene and produces an image. In general, the CCD array and, thus, the camera is substantially localized. Further, at least some distance is required between the lens and the CCD array which requires that a camera have some depth.

SUMMARY

The present disclosure provides systems, apparatuses, and methods relating to digital imaging systems. In some embodiments, a digital imaging system may include a plurality of independent pixel devices disposed on a surface exposed to a scene, each of the pixel devices including a photodiode having a limited field of view coupled to a battery and a transmitter antenna, each of the pixel devices configured to transmit information corresponding to light received from the scene by the photodiode using the transmitter antenna; a base station including one or more storage devices, a processor, and a receiver portion having one or more receiver antennas configured to receive wireless transmissions from the transmitter antennas, such that the receiver portion is in communication with each of the pixel devices; wherein a plurality of instructions are stored in the one or more storage devices and executable by the processor to convert the combined information of the transmissions received from the plurality of pixel devices into a digital image representing the scene.

In some embodiments, a method for capturing image data from a scene may include receiving wirelessly, at a data processing device, light intensity information from a plurality of independent lensless pixel devices embedded in a film on a surface exposed to a scene (e.g., a real-world scene), each of the pixel devices including a photodiode configured to capture the light intensity information, a power source, and an antenna configured to transmit the light intensity information to the data processing device, and converting, using one or more processors of the data processing device to execute an image generation module, the light intensity information from the plurality of pixel devices into a corresponding digital image representing the scene.

In some embodiments, a method for manufacturing an image capturing device may include applying a mixture comprising a plurality of pixel devices dispersed in a clear paint (e.g., clear latex paint) to a surface, such that the surface is coated by the mixture, each of the pixel devices including a photodiode configured to capture light intensity information, a power source, and an antenna disposed on a first major surface of a substrate, wherein a second major surface of the substrate is more hydrophilic than the first major surface and disposing a data processing system having a receiving antenna within an effective transmission range of the antennas of the plurality of pixel devices, such that data from the pixel devices is transmissible from each of the pixel devices to the data processing system.

Features, functions, and advantages may be achieved independently in various embodiments of the present disclosure, or may be combined in yet other embodiments, further details of which can be seen with reference to the following description and drawings.

DETAILED DESCRIPTION

Figure 1:
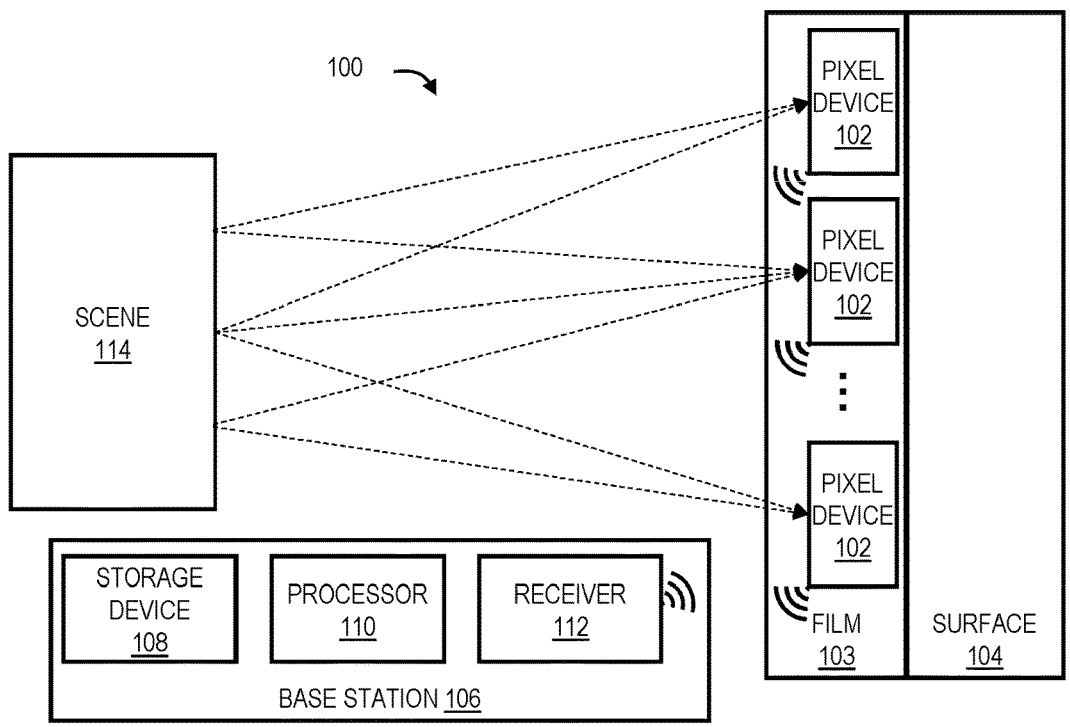
FIG. 1 is a schematic diagram of an illustrative digital imaging system as described herein.

Various aspects and examples of a paintable digital imaging system including a plurality of pixel devices, as well as related systems and methods, are described below and illustrated in the associated drawings. Unless otherwise specified, a digital imaging system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through H, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components, and is not necessarily limited to physical connection(s).

Overview

In general, a digital imaging system in accordance with the present teachings includes a plurality of small (e.g., sub-millimeter) pixel devices, each including a photodiode, a battery, and an antenna. The plurality of pixel devices are suspended in a liquid substrate, such as a transparent paint, and brushed or rolled onto an expanse, such as a wall. Each photodiode collects light, charging the associated battery, which powers the associated antenna. The antenna transmits a signal indicating the intensity of light incident on the photodiode to a processing logic-enabled base station (e.g., a designated computer). The signals sent by the plurality of pixel devices are received by the base station and converted into a digital image by the processing logic. The plurality of small pixel devices may be positioned substantially randomly, and the system may be configured to form an image of a scene without controlling the initial placement of individual pixel devices.

Aspects of digital imaging systems described herein may be embodied as a computer method, computer system, or computer program product. Accordingly, aspects of the digital imaging system described herein may take the form of an entirely hardware embodiment, an entirely software embodiment (including firmware, resident software, microcode, and the like), or an embodiment combining software and hardware aspects, all of which may generally be referred to herein as a "circuit," "module," or "system." Furthermore, aspects of the digital imaging system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the digital imaging system may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the digital imaging system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the digital imaging system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

In light of the above description, the term "processing logic" may be utilized to include any suitable device or hardware configured to process data by performing one or more logical and/or arithmetic operations (e.g., executing coded instructions). For example, processing logic may include one or more processors (e.g., central processing units (CPU) and/or graphics processing units (GPU)), microprocessors, clusters of processing cores, FPGAs (field-programmable gate arrays), artificial intelligence (AI) accelerators, digital signal processors, and/or any other suitable combination of logic hardware.

Examples, Components, and Alternatives

The following sections describe selected aspects of exemplary paintable digital imaging systems as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Digital Imaging System

As shown in FIG. 1, this section describes an illustrative paintable digital imaging system, generally indicated at 100. Digital imaging system 100 is an example of the digital imaging system described in the Overview above. Digital imaging system 100 may be referred to as an image capturing device and/or as a lensless camera system.

FIG. 1 is a schematic diagram of digital imaging system 100 exposed to a scene 114. Digital imaging system 100 includes a plurality of independent pixel devices 102 suspended in a substantially transparent film 103, which is disposed on a surface 104 (e.g., a wall). Pixel devices 102 may be referred to as camera pixel devices, chips, and/or photodiode chips.

System 100 further includes a base station 106 which is an example of a data processing system (see Section G), and includes one or more storage devices 108, processing logic 110, and a receiver portion 112. Pixel devices 102 are in wireless communication with a processing logic 110 via a receiver 112. Receiver 112 may include any suitable device configured to receive wireless transmissions from pixel devices 102. For example, receiver 112 may include one or more receiver antennas configured to receive wireless transmissions from transmitter antennas in pixel device 102. In some examples, receiver 112 may be part of and/or integrated with processing logic 110. In some examples, receiver 112 may include an antenna in communication with processing logic 110, a router, a Bluetooth wireless technology receiver, and/or any other suitable structure or mechanism configured to receive a signal. In some examples, receiver 112 may be integrated with processing logic 110 and/or may be a stand-alone device in wired and/or wireless communication with processing logic 110. Digital imaging system 100 may include a plurality of instructions for converting the information received from the plurality of pixel devices 102 into a digital image; the plurality of instructions may be stored in the one or more storage devices 108 and executable by processing logic 110.

Pixel devices 102 communicate with base station 106 (e.g., receiver 112 and/or processing logic 110), e.g., using any suitable wireless communication method. For example, pixel devices 102 may communicate with the base station using radio, Bluetooth wireless technology, Internet protocol, infrared communication, microwave communication, a cellular network, and/or any other suitable electromagnetic signal. For this purpose, each pixel device 102 includes a transmitter or a transceiver antenna for sending a wireless signal. In some examples, base station 106 further includes a transmitter configured to send a signal (e.g., containing instructions) to each pixel device 102.

Surface 104 may include any suitable expanse, whether planar or nonplanar, such as a wall, ceiling, screen, board, page, etc. For example, pixel devices 102 may be disposed on a wall, a ceiling, or the like. In some examples, pixel devices 102 may be disposed on a portable object such as an index card, a sheet of paper, a book, etc. In some examples, pixel devices 102 may be disposed on a mobile object such as a bike, a cart, a car, a truck, and/or any suitable vehicle.

In general, surface 104 is paintable (such as a wall) and/or compatible with adhesives. For example, pixel devices 102 may be embedded in a substantially transparent film 103 which covers surface 104. Film 103 may include any suitable substance configured to be applied in a liquid state and then to form a film (e.g., a clear and/or solid film) on surface 104. For example, film 103 may include a substantially transparent paint, adhesive, lacquer, and/or varnish. It is advantageous for film 103 to be transparent, so that light from scene 114 can reach pixel devices embedded in film 103, unimpeded. In some examples, film 103 may be absent, and pixel devices 102 may couple with surface 104 in another way. For example, pixel devices 102 may couple with surface 104 using electrostatic forces, and surface 104 may include materials and/or structure suitable for interacting with electrostatic forces. In some examples, pixel devices 102 may be adhered to surface 104 using an adhesive.

In combination with base station 106, plurality of pixel devices 102 are configured to capture light intensity information corresponding to scene 114. Although the current discussion refers to a scene, scene 114 may include an image, a plurality of images, a room, an event, a light source, and/or any other suitable subject that might be digitally imaged. Generally speaking, every part of scene 114 emits (e.g., refracts, reflects) light in all directions, at least some of which travels to and is incident on surface 104 and thus pixel devices 102. Each pixel device 102 measures the amount of light incident on that pixel device and transmits the measurement to base station 106.

Each pixel device 102 has a limited field of view, for example a 20 degree cone. Accordingly, light is incident on pixel device 102 from portions of the scene within that field of view. Thus, scene 114 is effectively divided into a plurality of regions, each of which correspond with one of the pixel devices. In some examples, the fields of view of some of the pixel devices may overlap at least partially. Some of the regions may also overlap.

Pixel devices 102 may include any suitable devices and/or mechanisms configured to transmit information corresponding to light received from scene 114 to base station 106. For example, pixel devices 102 may include a sub-millimeter lithographic device having a photodiode, a battery, and an antenna. In some examples, pixel devices 102 may further include a crystal resonator, a memory, a colored optical filter, and/or a processor.

Pixel devices 102 may measure incident light and transmit that measurement to processing logic 110 via any suitable method. For example, the photodiode on pixel device 102 may absorb incident light and pass the energy from the incident light to the battery. Pixel devices 102 may measure the amount of incident light using any suitable method. For example, pixel devices 102 may measure incident light by measuring the instantaneous rate of change of the battery charge, which is directly proportional to the intensity of light captured by the photodiode. In some examples, pixel devices 102 may measure incident light by measuring the amount of current exiting the photodiode. For example, pixel devices 102 may include a circuit configured to measure the incident light by measuring the current produced by the photodiode, the voltage produced by the photodiode, the rate at which the battery is charged, and/or any other suitable attribute of the pixel device. In some examples, excess energy which cannot be used or stored in the battery may be dissipated by one or more resistors and/or may be dissipated into the surrounding area.

Pixel devices 102 may be manufactured in any suitable manner. For example, pixel devices 102 may be lithographically produced on a silicon chip. The silicon chip may be cut from a larger silicon wafer before or after the other components of pixel device 102 are formed on the silicon. The silicon wafer and chip may be configured to facilitate inclusion in film layer 103 and/or disposition on surface 104. For example, prior to being cut into individual chips, the silicon wafer may be treated and/or manufactured so as to be compatible with a carrier (such as a paint or an adhesive) and/or one side of the wafer may be treated with an adhesive and/or other chemical to facilitate coupling with surface 104.

Pixel devices 102 may be applied to surface 104 using any suitable method. For example, pixel devices 102 may be mixed with any suitable liquid dispersion medium or carrier, and painted, spread, and/or sprayed onto surface 104. In some examples, the liquid dispersion medium may include paint, adhesive, and/or any suitable liquid composition configured to dry into a solid film after application to a surface in a thin layer, e.g., by brushing or rolling. In some examples, adhesive may be applied to the back of each pixel device 102 and a plurality of pixel devices 102 may be sprayed, urged, or tossed at surface 104. In some examples, some portion of the plurality of pixel devices 102 may not stick to surface 104. These may be allowed to fall to the ground and/or onto a drop cloth and may be gathered up to be reapplied to surface 104. In some examples, pixel devices 102 may couple to surface 104 using electrostatic forces. For example, pixel devices 102 maybe charged slightly and thrown or sprayed at surface 104 where they stick through electrostatic charge.

In some examples, processing logic 110 may algorithmically determine the position of each pixel device 102. Because pixel devices 102 are applied to surface 104 in a way that does not allow for controlling the position of each pixel device, the positions of each pixel device are determined after they have been applied to surface 104.

For example, each pixel device 102 may be configured to send a signal (or "ping") to receiver 112 while the receiver (or a proxy therefor) is in three or more different, known locations relative to the pixel device. Using the data from these signals, processing logic 110 can triangulate the location of each pixel device 102. For example, a signal travels from receiver 112 to pixel device 102, is received by the antenna of pixel device 102, and triggers a response from pixel device 102. In some examples, the response from pixel device 102 may include an identification number or code for the individual pixel device and may be picked up by receiver 112. The time delay between transmission of the original ping and receipt of the pixel device's response can be used to determine the distance between the pixel device and the receiver. Repeating this process with the receiver at two or more other known locations provides enough information to determine the position of the individual pixel device.

Alternatively or additionally, the plurality of pixel devices 102 may be exposed to one or more selected calibration images. Processing logic 110 uses information about the known images to determine which pixel measurement corresponds to which portion of scene 114. The calibration images may include any suitable controlled scene. For example, the calibration images may include selected two-dimensional images, and/or a positionable light source.

In some examples, to generate a picture from measurements of incident light, processing logic 110 includes one or more algorithms or processes for determining which pixel measurement corresponds with which portion of scene 114.

The field of view of each pixel 102 is limited. Thus, only a portion of scene 114 contributes to the light incident on each pixel device 102. By appropriately comparing the amount of light incident on each pixel device, processing logic 110 can construct a digital image of scene 114. For example, processing logic 110 may be configured to perform calculations involving linear algebra to determine the amount of light coming from each portion of scene 114.

More specifically, processing logic 110 may construct a digital image by executing an image generation module using linear algebra as follows. Processing logic 110 assigns each portion (AKA cell) of scene 114 to an element $L_m$ in a vector L, such that each element $L_m$ of vector L corresponds to the intensity of light emitted by the corresponding (i.e., mth) cell. Because the field of view of each pixel device is limited, each pixel device 102 receives light from only a subset of the cells of scene 114. Accordingly, the intensity of light incident on each pixel device corresponds to a sum of the subset of $L_m$ values of vector L that corresponds to the subset of the cells.

Each pixel device 102 is assigned to an element $P_n$ in a vector P (where the value of $P_n$ corresponds to the intensity of light incident on the nth pixel device). When the camera system captures an image of the scene, vector P corresponds to the light intensity information experienced and transmitted by the pixel devices. Accordingly, this is the information that needs to be converted into a digital image by the image generation module.

When each pixel device is assigned an identifier (i.e., n), the processor can determine a set of coefficients of a matrix A that describe which pixels receive light from which portions of the scene. In this example, each element of matrix A is set to either 0 or 1. If the nth pixel device receives light from (i.e., "sees") the mth cell of scene 114, the coefficient at $A_{nm}$ is 1. If the nth pixel device does not receive light from the mth cell of scene 114, the coefficient at $A_{nm}$ is 0. Each of the coefficients in matrix A may be determined by a calibration process.

The value of element $P_n$ (the intensity of light incident on the nth pixel device) is the sum of the elements of L that correspond to portions of scene 114 from which the nth pixel device receives light. In other words, the value of element $P_n$ is the sum of the elements L that correspond with a non-zero coefficient in A. In matrix form this is $P_n = A_{nm} L_m$. To reconstruct a digital image of scene 114, processing logic 110 solves this equation. For example, processing logic 110 left-multiplies by $A_{nm}^{-1}$ to get $L_m = A_{nm}^{-1} P_n$.

In some examples, $A_{nm}^{-1}$ may be calculated as part of the calibration process. Processing logic 110 then applies the conversion matrix $A_{nm}^{-1}$ each time a new image is constructed from a vector P. Note that, in this example, there must be as many or more elements in P than in L to ensure the linear algebra is solvable. In other words, in this example, scene 114 may only be divided into as many cells as there are pixel devices 102. In some examples, additional similar matrices of coefficients (e.g., having continuous values) may be utilized to convert the light intensity information L into a digital image.

Accordingly, the process for creating a digital image from the measurements of incident light may include a plurality of algebraic equations. These equations may be determined, refined, and/or solved by a machine learning and/or artificial intelligence algorithm. In some examples, the positions of individual pixel devices 102 may not be determined explicitly, and the process for creating a digital image from the measurements of incident light may be only implicitly dependent on the positions of the individual pixel devices.

In some examples, if one or more pixel device 102 is damaged, the system can be recalibrated to function without the damaged pixel devices. For example, pixel devices may be distributed substantially randomly on surface 104, and system 100 may not rely on pixel devices 102 being disposed in specific locations. This may be advantageous because, if one or more pixel devices 102 is damaged, system 100 may still be able to function using the remaining pixel devices. This greatly increases the reliability of digital imaging system 100.

Pixel devices 102 may be used in a variety of different modes. For example, pixel devices 102 may be used in subsets; a subset of the pixel devices on surface 104 may be sufficient to take a picture of scene 114. In some examples, a plurality of subsets of pixel devices 102 may be used to take successive pictures more quickly than a single set of pixel devices 102 can. In general, an individual pixel device may need to charge a battery to a certain threshold to transmit a measurement and reaching that threshold may take a minimum amount of time. Accordingly, one subset of pixel devices 102 may be able to take a picture of scene 114 while another subset of pixel devices 102 is charging. This doubles the rate at which system 100 can take pictures of scene 114. In some examples, a plurality of subsets of pixel devices 102 can be used to take a video of scene 114. Thus, digital imaging system 100 may be used to take video using a plurality of subsets of pixel devices 102 and/or to take a single higher-resolution picture using all of the pixel devices.

Pixel devices 102 may also be used in a differential mode. For example, devices 102 may be configured to only transmit light intensity information when there is a significant change in the intensity of light received by the photodiode. In some examples, a measurement may be transmitted only when there is a significant change in the rate of change of the charge of the rechargeable battery. The change in the intensity of light may be detected in any suitable manner. For example, each pixel device may determine a baseline which may be updated at periodic intervals and the amount of incident light may be continuously or substantially continuously compared to the baseline.

B. Illustrative Camera Pixel Device

Figure 2:
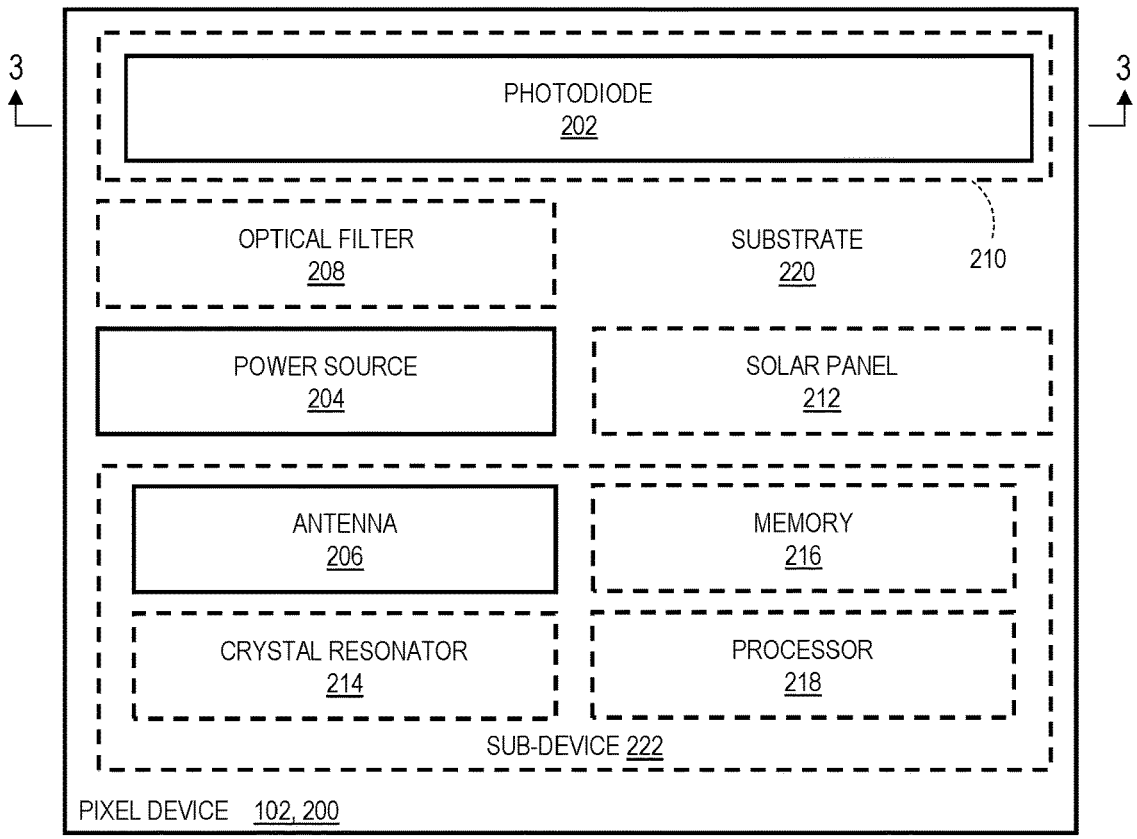
FIG. 2 is a schematic diagram of an illustrative pixel device as described herein.
Figure 3:
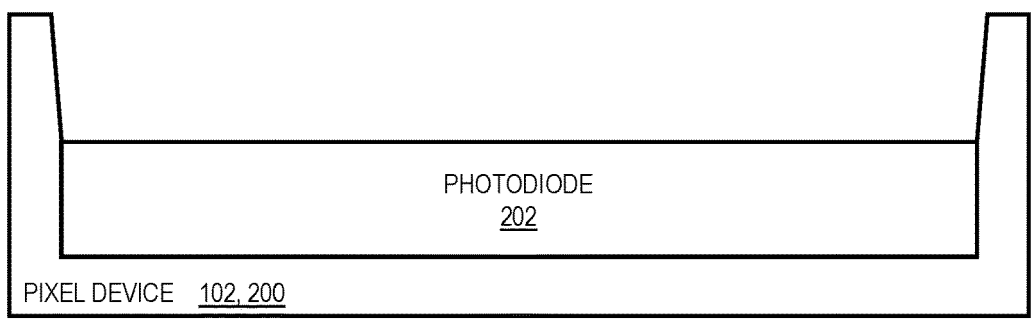
FIG. 3 is a cross-section of an embodiment of the pixel device of FIG. 2 taken at line 3 and in accordance with aspects of the present disclosure.
Figure 4:
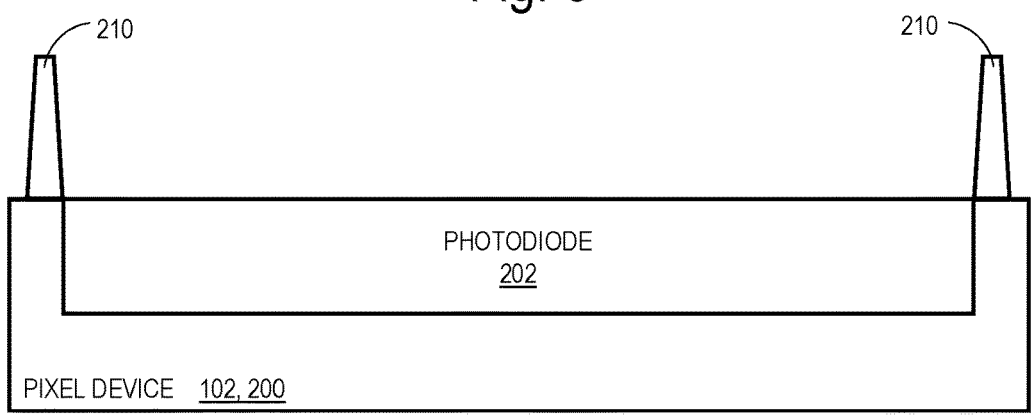
FIG. 4 is a cross-section of another embodiment of the pixel device of FIG. 2 taken at line 3 and in accordance with aspects of the present disclosure.

As shown in FIGS. 2-4, this section describes an illustrative pixel device. Pixel device 200 is an example of pixel device 102, described above. FIG. 2 depicts a block diagram of camera pixel device 200. Camera pixel device 200 may be referred to as a pixel device, a chip, and/or a photodiode chip.

In general, pixel device 200 works with base station 106 to capture light intensity information about and/or take a picture of a scene (e.g., scene 114). Each pixel device 200 measures the amount of light incident on pixel device 200 and transmits the measurement to base station 106. Pixel device 200 may include any suitable structures and/or mechanisms configured to acquire and transmit information corresponding to light received from scene 114.

In this example, pixel device 200 includes a photodiode 202, a power source 204, and an antenna 206. Photodiode 202 may include any suitable structure and/or mechanism configured to absorb and convert incident electromagnetic waves into electrical energy. For example, photodiode 202 may include a semiconductor device configured to convert light into electrical current. In some examples, photodiode 202 may include optical filters such as a colored optical filter 208. For example, optical filter 208 may limit the amount and/or frequency of light which is incident on photodiode 202.

The field of view (FOV) of photodiode 202 is mechanically limited, e.g., to a twenty degree span. In some examples, photodiode 202 may be surrounded by a frame 210 which may be configured to limit the field of view of photodiode 202. For example, frame 210 may limit the amount of light incident on photodiode 202 and/or may limit the directions from which light is incident on photodiode 202 (see FIG. 3). In some examples, photodiode 202 may be recessed, such that the chip substrate provides the desired FOV limitation (see FIG. 4). The electrical energy produced by photodiode 202 may be passed to other portions of pixel device 200. For example, electrical energy produced by photodiode 202 may be used to power pixel device 200.

Power source 204 may include a battery and/or any other suitable source of electrical power. For example, power source 204 may include a rechargeable battery. In some examples, light incident on photodiode 202 may be used to charge power source 204. In some examples, pixel device 200 may include a separate solar panel 212 which charges power source 204.

Antenna 206 may include any suitable structure configured to transmit information corresponding to light incident on the photodiode. For example, antenna 206 may include a transmitter or transceiver configured to communicate with base station 106. In some examples, the antenna may be configured to receive and/or transmit radio signals, microwave signals, infrared signals, Bluetooth wireless technology communications and/or any suitable wireless communication method. In some examples, the pixel device may communicate with base station 106 using radio-frequency identification (RFID) technology and/or ultra-high frequency (UHF) signals. In some examples, the antenna may be integrated with a low capacity processor.

In some examples, pixel device 200 may include other components, such as a crystal resonator 214, a memory 216, an optical filter 208, and/or a processor 218. For example, crystal resonator 214 may include an electronic oscillator circuit and/or any suitable time keeping circuit and/or mechanism. In some examples, memory 216 may include any suitable computer readable memory and/or storage device configured to facilitate the storage of operation instructions and/or information related to incident light.

Further, optical filter 208 may include a colored optical filter and/or any suitable mechanism for limiting and/or selecting how much light reaches the photodiode. For example, optical filter 208 may allow only certain wavelengths of light to reach the photodiode. Processor 218 may include a limited processor suitable for facilitating measuring incident light and/or executing instructions stored on memory 216 and/or received by antenna 206. Additionally, or alternatively, pixel device 200 may include any suitable components configured to facilitate measuring and transmitting information related to incident light.

In some examples, digital imaging system 100 may include one or more different types of pixel device 200. For example, digital imaging system 100 may comprise a first set of pixel devices 200 having optical filters 208 that allow only red light to pass, a second set of pixel devices 200 having optical filters 208 that allow only green light to pass, and a third set of pixel devices 200 having optical filters 208 that allow only blue light to pass, such that processing logic 110 may be configured to process the measured incident light into a full-color image.

In some examples, some of the components may be combined into one subassembly 222. For example, antenna 206, crystal resonator 214, memory 216, and/or processor 218 may be combined into one sub-device and/or circuit, referred to herein as subassembly 222. In some examples, pixel device 200 may include photodiode 202, power source 204, and subassembly 222 disposed on a substrate 220. Subassembly 222 may include any of antenna 206, crystal resonator 214, memory 216, and/or processor 218, as well as other devices and/or components.

Each of the components of pixel device 200 (photodiode 202, power source 204, antenna 206, solar panel 212, optical filter 208, and/or subassembly 222) are mounted on substrate 220. Substrate 220 may include any suitable structure and/or substance configured to support the components of pixel device 200, e.g., a silicon chip. Further, substrate 220 may include any suitable material and/or coating configured to facilitate a desired interaction with a liquid medium (e.g., paint) and/or surface 104. In some examples, photodiode 202, power source 204, antenna 206, and/or solar panel 212 may be lithographically produced on a silicon surface. Pixel device 200 may include a sub-millimeter lithographic device.

Each pixel device 200 may be cut from a larger silicon wafer before or after the other components are formed on the silicon. Prior to being cut into individual pixel devices, the silicon wafer may, in some examples, be treated and/or manufactured so as to be compatible with a base and/or one side of the wafer may be treated with an adhesive and/or other chemical to facilitate coupling with surface 104. In some examples, the back of the wafer may be treated with a chemical functionalization that is compatible with the liquid dispersion medium so that the pixel device is suspendable in the medium. The liquid dispersion medium may include any suitable liquid composition configured to dry into a solid film after application to a surface in a thin layer, e.g., by brushing or rolling. In some examples, the medium may include a paint, an adhesive, a lacquer, a varnish, a pigment, an oil, a coating, and/or the like. In general, the medium is substantially transparent to allow light to reach pixel devices 200. For example, the base may include a substantially transparent paint and/or a clear paint (e.g., clear latex paint), which is applied so that it covers surface 104. In examples where the medium is water-based (such as a water-based latex paint), the back of the wafer may be treated to make it hydrophilic, or at least more hydrophilic than the front, to produce pixel devices that preferentially face away from the underlying surface. This may be done, for example, by forming a layer of silica or treating the back of the wafer with a surfactant. In some examples, a layer of silica may be formed on the back of the wafer by heating the wafer and exposing the back of the wafer to oxygen.

Following application of the pixel device mixture to the surface, as the medium dries, the differential in hydrophilic characteristics is configured to cause the pixel device to preferentially orient such that the front of the pixel faces outwards. In other words, the one-side-hydrophilic configuration causes the pixel devices to act as surface active agents (i.e., surfactants).

Treating the pixel devices in this way is advantageous because probability suggests that—without such a treatment—only approximately 50% of the pixel devices painted on a surface will face out from the surface. Pixel devices oriented with the front facing the wall receive no incident light, do not generate power, send no signals, and are inoperable. Treating the pixel devices such that they preferentially orient with the front facing away from the wall substantially reduces the percentage of pixel devices that face the wall and thus receive no incident light.

FIGS. 3 and 4 are sectional views of two embodiments of pixel device 200 taken at line 3-3. FIG. 3 depicts a first embodiment in which photodiode 202 is recessed in substrate 220 and substrate 220 limits the field of view of photodiode 202. FIG. 4 depicts a second embodiment in which photodiode 202 is level with the surface of substrate 220 and frame 210 limits the field of view of photodiode 202. For example, the field of view may be limited to between approximately 10 degrees and approximately 30 degrees. In some examples, the field of view may be limited to approximately 20 degrees. Frame 210 may include any suitable material and/or structure configured to limit the field of view of photodiode 202 by a desired amount. For example, frame 210 may include a wire, ridge, flange and/or any other raised structure which runs around the outside edge of photodiode 202.

Other components (such as power source 204, solar panel 212, antenna 206, etc.) may or may not be recessed in substrate 220. Components other than photodiode 202 may be located at any suitable depth in substrate 220. For example, one or more of the components may be disposed on the surface of substrate 220, may be partially recessed into the surface of substrate 220, and/or may be fully recessed below the surface of substrate 220 at any suitable depth.

Optical filter 208 may be disposed over the surface of photodiode 202. For example, optical filter 208 may include a film placed over the top of photodiode 202. In some examples, optical filter 208 may be integrated with photodiode 202.

Pixel devices 200 are configured to measure the amount of light incident on photodiode 202, and may utilize any suitable method. For example, power source 204 may be a rechargeable battery. As such, pixel devices 200 may measure the instantaneous rate of change of the charge of the battery, which is directly proportional to the intensity of light captured by photodiode 202. In some examples, pixel devices 200 may measure incident light by determining the amount of electrical energy produced by photodiode 202. For example, pixel devices 200 may include a circuit configured to measure the incident light by measuring the current produced by photodiode 202, the voltage produced by photodiode 202, the rate at which a battery is charged, and/or any other suitable attribute. In some examples, excess energy which cannot be used or stored by power source 204 and/or any other component may be dissipated by one or more resistors and/or may be dissipated into the surrounding area.

Pixel devices 200 may be applied to surface 104 using any suitable method. For example, pixel devices 200 may be mixed with any suitable dispersion medium and painted, spread, and/or sprayed onto surface 104. As discussed above, the medium may include any suitable liquid composition configured to dry into a solid film after application in a thin layer to surface 104, such as paint or adhesive. For example, a plurality of pixel devices 200 may be mixed with a substantially clear latex paint and applied to surface 104, e.g., by brushing or rolling.

In some examples, adhesive may be applied to the back of each pixel device 200 and a plurality of pixel devices 200 may be air-sprayed or otherwise urged onto surface 104. In some examples, some pixel devices 200 may not stick to surface 104 and may fall to the ground and/or onto a drop cloth, and may be gathered up to be reapplied to surface 104. Applying adhesive to only the back of each pixel device 200 ensures that only pixel devices facing out from surface 104 stick, while those facing the wall can be gathered up and reapplied.

In some examples, pixel devices 200 may couple to surface 104 using electrostatic forces. For example, pixel devices 200 may be charged and then urged onto surface 104, where they stick to surface 104 through electrostatic charge. In some examples, naked pixel devices 200 may be urged onto surface 104 immediately after it has been coated with a paint or adhesive. For example, pixel devices 200 may be tossed at a wall that has just been coated with an adhesive, thereby sticking to the adhesive.

C. Illustrative Camera Surface

Figure 5:
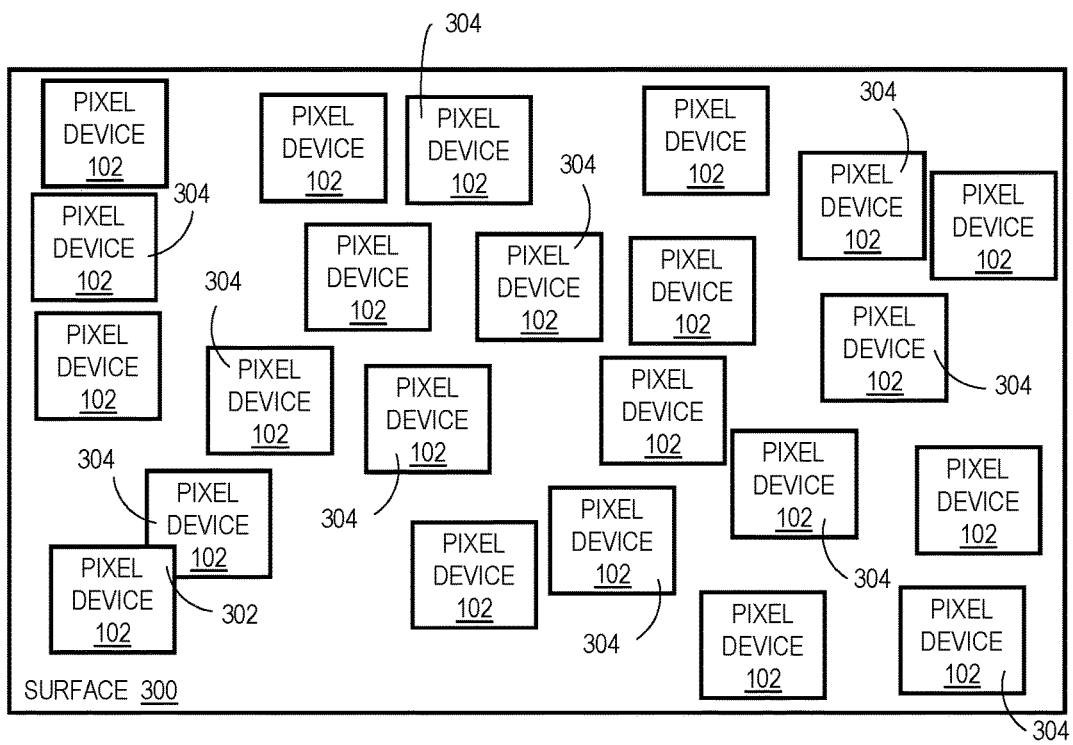
FIG. 5 is a schematic diagram of an illustrative surface as described herein.
Figure 6:
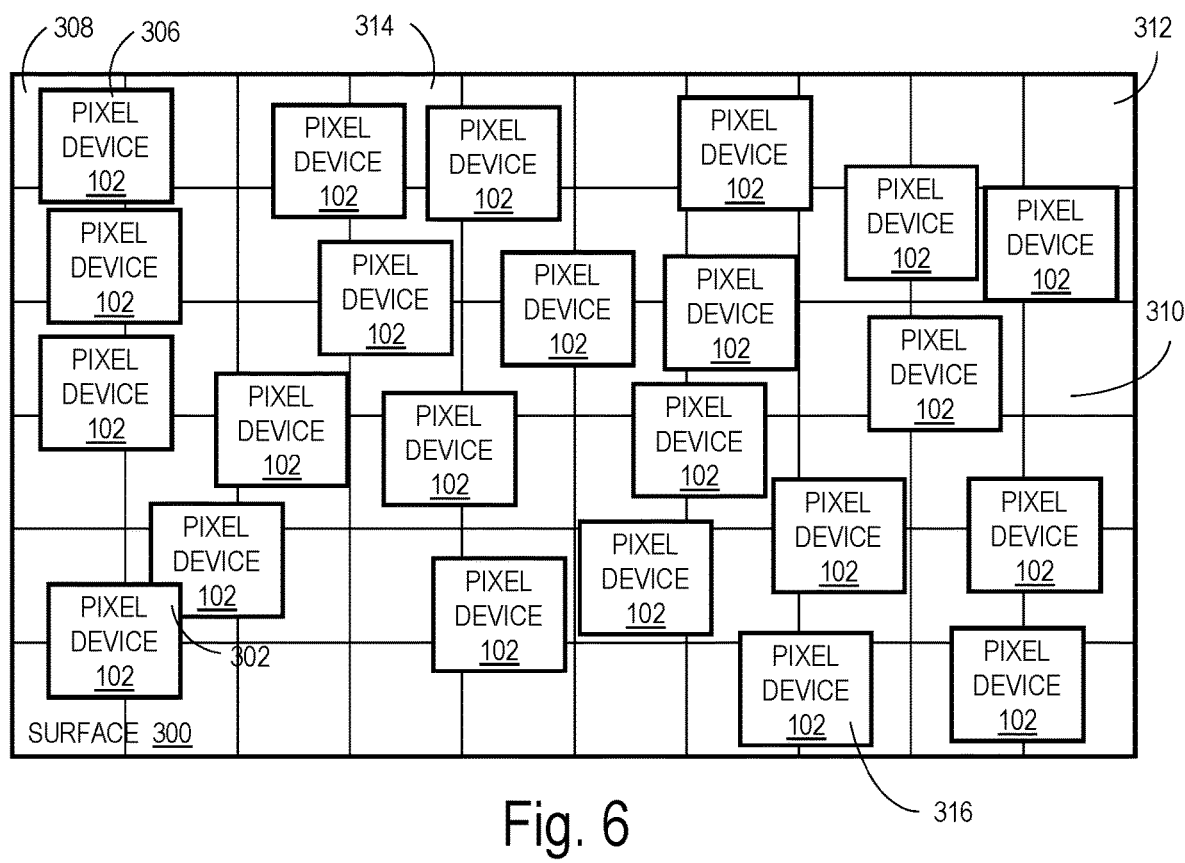
FIG. 6 is a schematic diagram of an illustrative surface as described herein and shows a grid.

As shown in FIGS. 5-6, this section describes an illustrative surface covered with pixel devices (e.g., devices 102 or 200, shown here as devices 102). Surface 300 is an example of surface 104, described above.

Note that FIGS. 5 and 6 show magnified portions of a surface 300. Pixel devices 102 are small (e.g., sub-millimeter) devices, and surface 300 includes an expanse, such as a piece of paper or a wall. Surface 300 may be covered with any suitable number of pixel devices. For example, surface 300 may include multiple thousands and/or multiple millions of pixel devices. In some examples, surface 300 may include approximately a million pixel devices. FIGS. 5 and 6 represent magnifications of a small portion of such a surface and depict only a small number of pixel devices.

In the example shown in FIG. 5, most pixel devices 102 are distributed such that no two pixel devices overlap. A pair of pixel devices overlap at location 302. In some examples, pixel devices 102 may be distributed such that no pixel devices 102 overlap. In some examples, pixel devices 102 may be distributed such that some pixel devices overlap, for example, as shown at 302. Allowing pixel devices 102 to overlap may reduce the field of view of individual pixel devices, however, distributing the pixel devices such that they do not overlap may limit how close together the pixel devices can be, and thus may reduce the maximum possible resolution. Pixel devices 102 may be distributed substantially randomly and/or substantially uniformly. In some examples, pixel devices 102 may be distributed according to any suitable pattern. For example, pixel devices 102 may be distributed so that there are more pixel devices 102 in one area than another and/or such that there are no pixel devices 102 in a particular area. For example, if surface 300 is a wall, it may be disadvantageous to distribute pixel devices where there is going to be a hanging picture and/or furniture that might block light from scene 114. Additionally, or alternatively, if surface 300 is a portable device, it may be disadvantageous to distribute pixel devices in locations of high wear, and/or where pixel devices 102 may be damaged.

As described above, pixel devices 102 may stick to surface 300 by any suitable mechanism and may be applied to surface 104 by any suitable method depending on characteristics of surface 300, pixel devices 102, and/or the mechanism by which the pixel devices are held to the surface.

Any suitable method may be used to group pixel devices 102 into subsets. For example, the subsets may be determined based on the locations of pixel devices 102 and/or the subsets may be determined using a machine learning algorithm. FIG. 5 shows an illustrative subset of pixel devices 102 denoted by reference number 304. The remaining pixel devices 102 may comprise a second subset. In some examples, pixel devices 102 in locations which receive more incident light may be able to charge more quickly and therefore may be able to take pictures more often. In some examples, a subset of pixel devices 102 may be formed which includes primarily pixel devices in well-lit locations so that the subset can take pictures more frequently. Additionally, or alternatively, if one or more pixel devices 102 are damaged, the subsets can be recalibrated to function without the damaged pixel devices.

FIG. 6, similar to FIG. 5, depicts a portion of an example of a surface 300 which includes a plurality of pixel devices 102. In FIG. 6, surface 300 is divided up into a plurality of regions. In some examples, determining which pixel device 102 corresponds with which portion of scene 114 may include comparing the measurements from each pixel device 102 to the expected measurement from each region given a selected calibration image. For example, if pixel device 306 transmits a measurement substantially corresponding to the expected measurement for region 308 given a selected calibration image, processing logic 110 may determine the location of pixel device 306 to be approximately in region 308. This process may be repeated for each region. In some examples, not all regions may have a pixel device to be compared to (for example regions 310 and 312). In some examples, multiple pixel devices may correspond with the same region (for example region 314). In some examples, one pixel device (such as pixel device 316) may correspond with more than one region and processing logic 110 may determine that the location of the pixel device is an average of the locations of the regions.

D. First Illustrative Method

Figure 7:
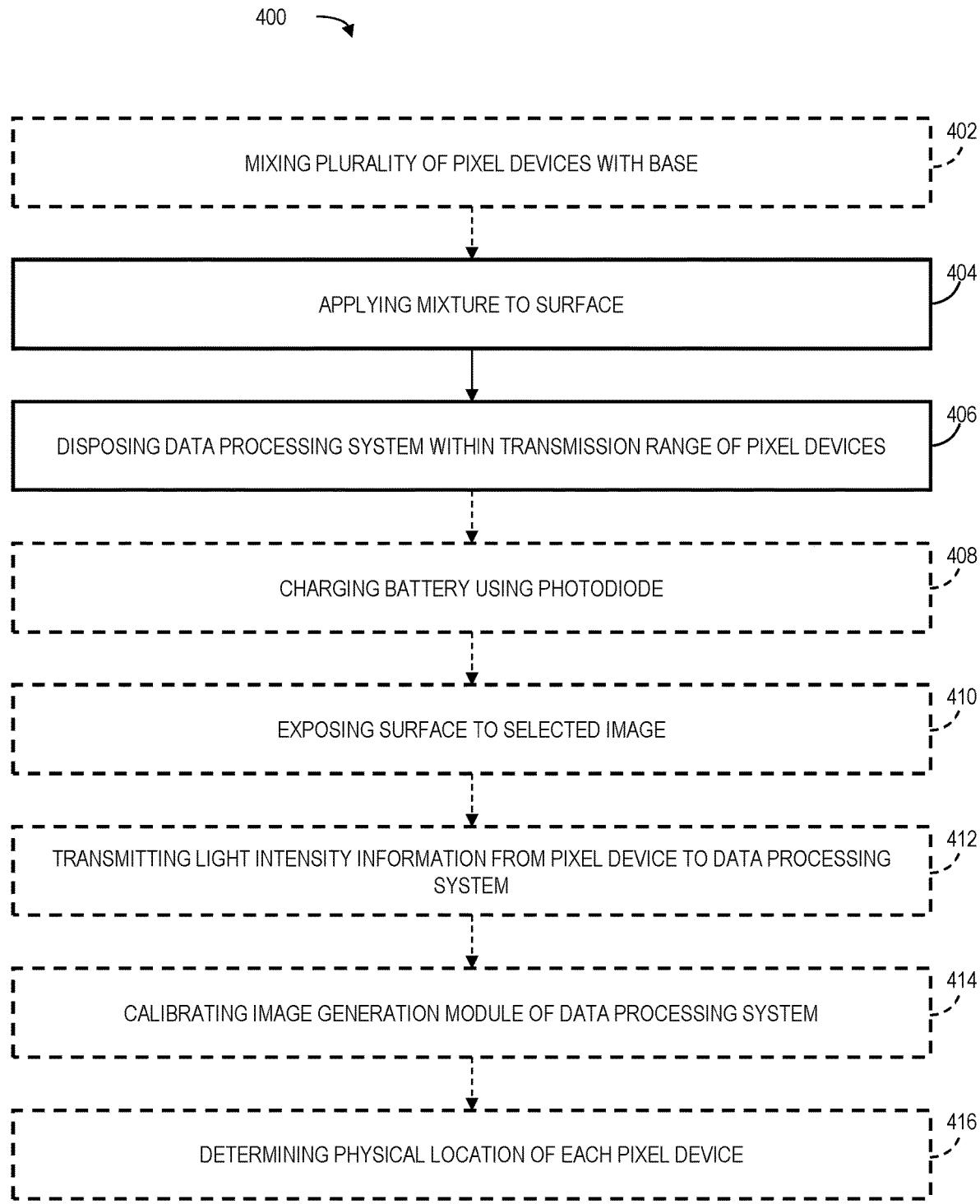
FIG. 7 is a flow chart depicting steps of an illustrative method for manufacturing an image capturing device according to the present teachings.

This section describes steps of an illustrative method 400 for manufacturing an image capturing device; see FIG. 7. Aspects of digital imaging system 100, pixel device 200, and/or surface 300 may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of the method. Although various steps of method 400 are described below and depicted in FIG. 7, the steps need not necessarily all be performed, and in some cases may be performed simultaneously or in a different order than the order shown.

At optional step 402, a user may mix a plurality of pixel devices 102 (or pixel devices 200) with a liquid dispersion medium. For example, a plurality of pixel devices 102 may be dispersed in a clear or transparent latex paint. The medium may include a paint, adhesive, and/or any other suitable spreadable liquid. As described above, pixel devices 102 (or 200) include a photodiode configure to capture light intensity information, a power source and an antenna. For example, the photodiode, the power source, and the antenna may be disposed on a first major surface of a substrate, and a second major surface of the substrate may be more hydrophilic than the first major surface. In some examples, the power source may include a rechargeable battery and the light intensity information may correspond to a rate of change of a charge on the battery.

At step 404, the user applies the mixture of pixel devices and the liquid dispersion medium to a surface (such as surface 104), such that the surface is coated by the mixture. For example, the user may apply the pixel devices to surface 104 or 300. The plurality of pixel devices 102 may be applied to the surface by any suitable method. For example, the mixture may be brushed, rolled, and/or sprayed on.

At step 406, the user disposes a data processing system (e.g., base station 106) within an effective transmission range of the antennas of the plurality of pixel devices. For example, the data processing system may be positioned such that data from the pixel devices is transmissible from each of the pixel devices to the data processing system. In some examples, the data processing system may include a receiving antenna.

In some examples, the power source in each of the pixel devices is a rechargeable battery. At optional step 408, the user charges each of the rechargeable batteries using the photodiodes in each pixel device 102.

At optional step 410, the surface is exposed to a selected image such that light from the selected image is received by a subset of the pixel devices that have first faces oriented toward the image. In some examples, some of the pixel devices on the surface may have first faces oriented away from scene 114 and may be inoperable. For example, the image capturing device (and/or digital imaging system 100) may be operable using only the subset of the pixel devices that have first faces oriented towards scene 114. In some examples, the selected image may also be referred to as a calibration image. In some examples, the selected image may be a controlled scene and/or a positionable light source.

At optional step 412, light intensity information from each pixel device in the subset of pixel devices is transmitted to the data processing system. For example, the light intensity information may correspond to a rate of change of a charge on the rechargeable battery. In some examples, the pixel devices may not include a rechargeable battery and the light intensity information may correspond to any other suitable measurement of the amount of light incident on the photodiode.

At optional step 414, an image generation module of the data processing system is calibrated. In some examples, calibrating the image generation module may include the use of light intensity information from each pixel device after the pixel devices have been exposed to a selected image. For example, the user may take pictures of one or more reference images using pixel devices 102. Pixel devices 102 may send the information about the light incident on the pixel devices to the data processing system. The data processing system may use the information from pixel devices 102 and information about the selected image to determine an algorithm for creating an image from the information from the pixel devices. At optional step 416, the user may determine the physical location of each pixel device. For example, the data processing system may use information from previous steps to calculate the position of each pixel device.

In some examples, the user may repeat steps 410-416 to recalibrate the plurality of pixel devices 102 using one or more selected images. For example, the data processing system may use the information from pixel devices 102 and information about the selected image to determine and/or refine an algorithm for creating an image from the information from the pixel devices. In some examples, recalibration may be needed periodically, for example, as the system ages. In some examples, recalibration may be needed when something changes about the system. For example, recalibration may be needed when some pixel devices 102 are damaged or if new pixel devices 102 are added.

E. Second Illustrative Method

Figure 8:
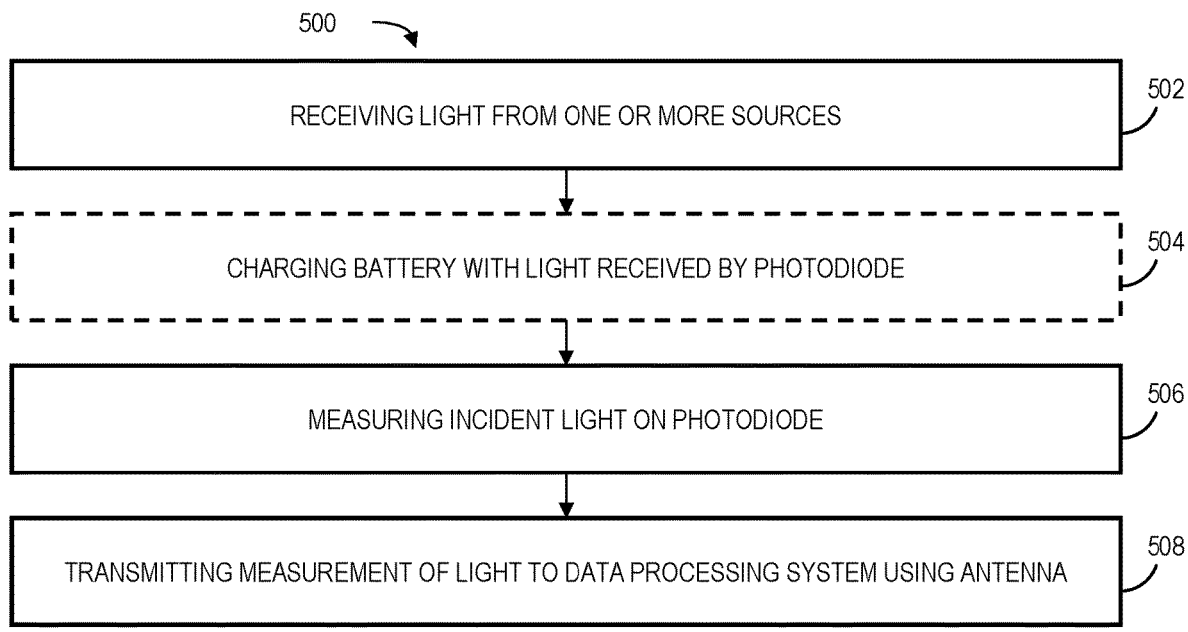
FIG. 8 is a flow chart depicting steps of an illustrative method for using an illustrative pixel device according to the present teachings.

This section describes steps of an illustrative method 500 for operating a pixel device, such as pixel device 200; see FIG. 8. Aspects of digital imaging system 100, pixel device 200, and/or surface 300 may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 500 are described below and depicted in FIG. 8, the steps need not necessarily all be performed, and in some cases may be performed simultaneously or in a different order than the order shown.

At step 502, a pixel device 200 receives light from one or more sources. Each portion of a scene or image emits light in all directions, and photodiode 202 of pixel device 200 receives light from all of portions of the scene or image that are within the field of view of the photodiode. Some or all of the light which is incident on photodiode 202 is absorbed by the photodiode and, in some examples, may be converted to electrical energy which is passed to a rechargeable battery (such as power source 204).

At optional step 504, pixel device 200 charges the rechargeable battery (if present) with the energy produced by photodiode 202.

At step 506, pixel device 200 measures the light incident on photodiode 202. For example, pixel device 200 may measure the amount of energy produced by photodiode 202. In some examples, step 506 may include measuring the time rate of change of the charge on the rechargeable battery. In some examples, step 506 may include any suitable method for measuring the amount of energy produced by photodiode 202 such as measuring the current produced by photodiode 202. At step 508, pixel device 200 transmits the measurement of incident light to a data processing system using antenna 206. Antenna 206 may transmit the measurement using any suitable form of wireless communication.

F. Third Illustrative Method

Figure 9:
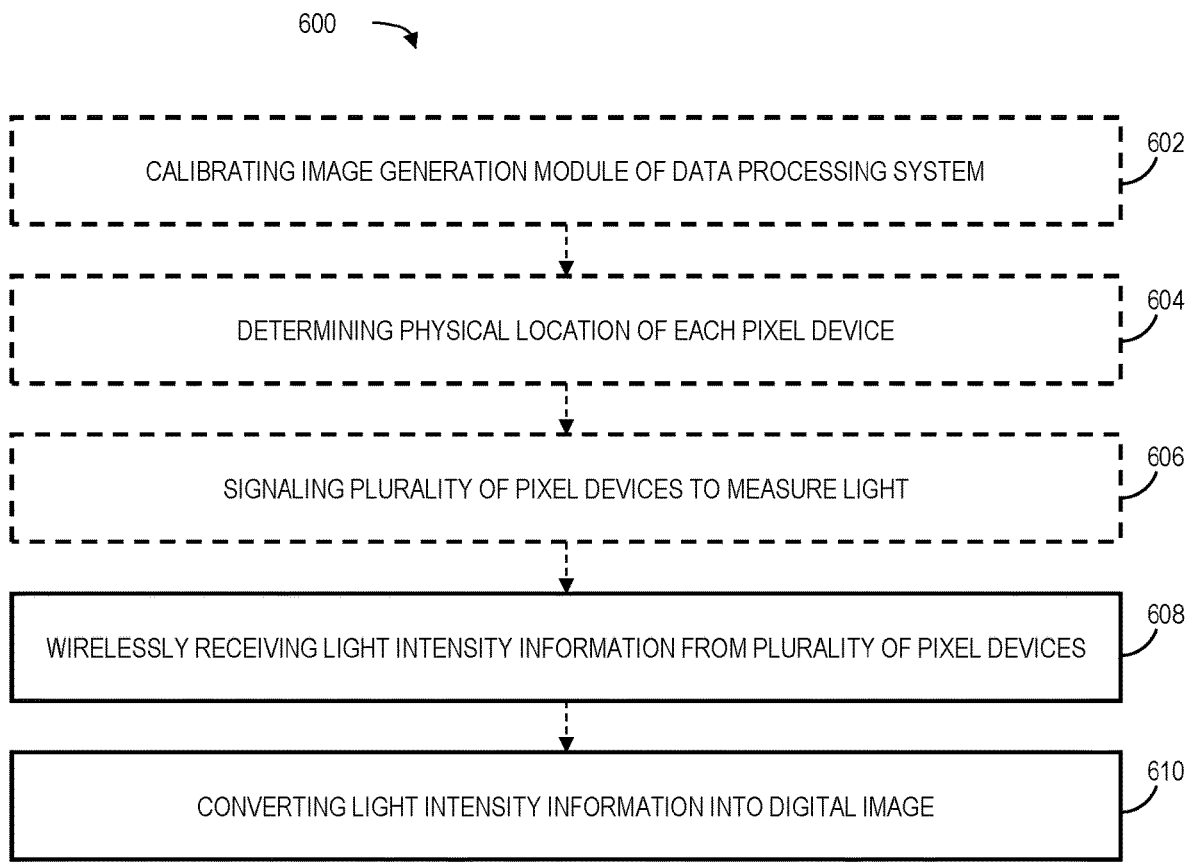
FIG. 9 is a flow chart depicting steps of an illustrative method for capturing image data from a scene according to the present teachings.

This section describes steps of an illustrative method 600 for capturing image data from a scene; see FIG. 9. Aspects of digital imaging system 100, pixel device 200, and/or surface 300 may be utilized in the method steps described below. Where appropriate, reference may be made to components and systems that may be used in carrying out each step. These references are for illustration, and are not intended to limit the possible ways of carrying out any particular step of the method.

FIG. 9 is a flowchart illustrating steps performed in an illustrative method, and may not recite the complete process or all steps of the method. Although various steps of method 600 are described below and depicted in FIG. 9, the steps need not necessarily all be performed, and in some cases may be performed simultaneously or in a different order than the order shown.

At optional step 602, the user calibrates an image generation module of the data processing system by exposing the plurality of pixel devices to one or more controlled scenes. For example, the user may take pictures of one or more reference images using pixel devices 102. Pixel devices 102 may send information about the incident light to a data processing system. The data processing system may use the information from pixel devices 102 and information about the controlled scene to determine an algorithm for creating an image from the information from the pixel devices. At optional step 604, the user may determine the positions of the pixel device based on the light intensity information expected to be caused by the one or more controlled scenes. In some examples, optional step 604 may include the use of one or more processors. For example, the data processing system may use information from previous steps to calculate the physical location of each pixel device. The one or more controlled scenes may include any suitable scene, light pattern, and/or image configured to facilitate the calibration of the digital imaging system. For example, the controlled scene may include a selected image such as a calibration image. In some examples, the controlled scene may include a positionable light source.

At optional step 606, a processing logic 110 signals a plurality of pixel devices 102 (or pixel device 200) to measure incident light. For example, the data processing system may transmit instructions to the plurality of pixel devices 102 to measure the incident light. In some examples, all of the pixel devices may be signaled at the same time and, in some examples, only a subset of pixel devices may be signaled.

At step 608, the user receives wirelessly, at the data processing device, light intensity information from a plurality of independent lensless pixel devices such as pixel devices 102 and/or 200. For example, the plurality of independent lensless pixel devices may be embedded in a film on a surface and exposed to an organic scene (e.g., a real-world environment). In some examples, the film may comprise a latex paint. Further, each of the independent lensless pixel devices include a photodiode configured to capture light intensity information, a power source, and an antenna configured to transmit the light intensity information to the data processing device.

At step 610, the user converts the light intensity information from the plurality of independent lensless pixel devices into a corresponding digital image representing the organic scene. In some examples, step 610 may include using one or more processors of the data processing device to execute an image generation module.

In some examples, the user may repeat steps 602-604 at any point in method 600 to recalibrate the plurality of pixel devices 102 using one or more controlled scenes. For example, the data processing system may use the information from pixel devices 102 and information about the controlled scenes to determine and/or refine an algorithm for creating a digital image from the information from the pixel devices. In some examples, recalibration may be needed periodically, for example, as the system ages. In some examples, recalibration may be needed when something changes about the system. For example, recalibration may be needed when some of pixel devices 102 are damaged or if new pixel devices 102 are added.

G. Illustrative Data Processing System

Figure 10:
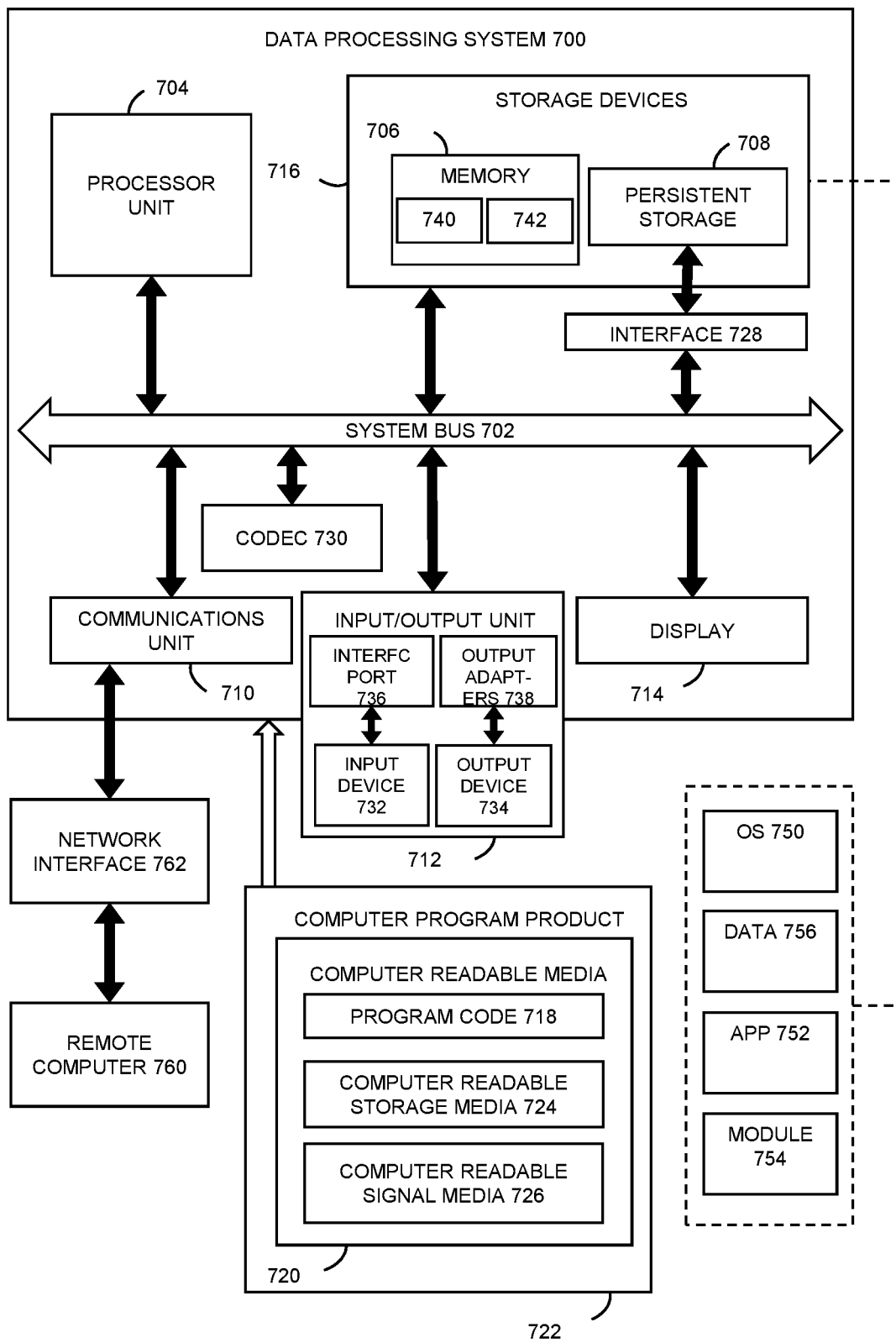
FIG. 10 is a schematic diagram of an illustrative data processing system as described herein.

As shown in FIG. 10, this example describes a data processing system 700 (also referred to as a computer, computing system, and/or computer system) in accordance with aspects of the present disclosure. In this example, data processing system 700 is an illustrative data processing system suitable for implementing aspects of the digital imaging system. More specifically, in some examples, devices that are embodiments of data processing systems (e.g., smartphones, tablets, personal computers) may be configured to receive light intensity information from a plurality of pixel devices and to convert the light intensity information into a digital image representing a real-world scene. For example, base station 106 may comprise a data processing system as described in this section.

In this illustrative example, data processing system 700 includes a system bus 702 (also referred to as communications framework). System bus 702 may provide communications between a processor unit 704 (also referred to as a processor or processors), a memory 706, a persistent storage 708, a communications unit 710, an input/output (I/O) unit 712, a codec 730, and/or a display 714. Memory 706, persistent storage 708, communications unit 710, input/output (I/O) unit 712, display 714, and codec 730 are examples of resources that may be accessible by processor unit 704 via system bus 702.

Processor unit 704 serves to run instructions that may be loaded into memory 706. Processor unit 704 may comprise a number of processors, a multi-processor core, and/or a particular type of processor or processors (e.g., a central processing unit (CPU), graphics processing unit (GPU), etc.), depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device may include any suitable hardware capable of storing information (e.g., digital information), such as data, program code in functional form, and/or other suitable information, either on a temporary basis or a permanent basis.

Storage devices 716 also may be referred to as computer-readable storage devices or computer-readable media. Memory 706 may include a volatile storage memory 740 and a non-volatile memory 742. In some examples, a basic input/output system (BIOS), containing the basic routines to transfer information between elements within the data processing system 700, such as during start-up, may be stored in non-volatile memory 742. Persistent storage 708 may take various forms, depending on the particular implementation.

Persistent storage 708 may contain one or more components or devices. For example, persistent storage 708 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 708 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 708 to system bus 702, a removable or non-removable interface is typically used, such as interface 728.

Input/output (I/O) unit 712 allows for input and output of data with other devices that may be connected to data processing system 700 (i.e., input devices and output devices). For example, input device 732 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 704 through system bus 702 via interface port(s) 736. Interface port(s) 736 may include, for example, a serial port, a parallel port, a game port, and/or a universal serial bus (USB).

Output devices 734 may use some of the same types of ports, and in some cases the same actual ports, as input device(s) 732. For example, a USB port may be used to provide input to data processing system 700 and to output information from data processing system 700 to an output device 734. Output adapter 738 is provided to illustrate that there are some output devices 734 (e.g., monitors, speakers, and printers, among others) which require special adapters. Output adapters 738 may include, e.g. video and sounds cards that provide a means of connection between the output device 734 and system bus 702. Other devices and/or systems of devices may provide both input and output capabilities, such as remote computer(s) 760. Display 714 may include any suitable human-machine interface or other mechanism configured to display information to a user, e.g., a CRT, LED, or LCD monitor or screen, etc.

Communications unit 710 refers to any suitable hardware and/or software employed to provide for communications with other data processing systems or devices. While communication unit 710 is shown inside data processing system 700, it may in some examples be at least partially external to data processing system 700. Communications unit 710 may include internal and external technologies, e.g., modems (including regular telephone grade modems, cable modems, and DSL modems), ISDN adapters, and/or wired and wireless Ethernet cards, hubs, routers, etc. Data processing system 700 may operate in a networked environment, using logical connections to one or more remote computers 760. A remote computer(s) 760 may include a personal computer (PC), a server, a router, a network PC, a workstation, a microprocessor-based appliance, a peer device, a smart phone, a tablet, another network note, and/or the like. Remote computer(s) 760 typically include many of the elements described relative to data processing system 700. Remote computer(s) 760 may be logically connected to data processing system 700 through a network interface 762 which is connected to data processing system 700 via communications unit 710. Network interface 762 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 730 may include an encoder, a decoder, or both, comprising hardware, software, or a combination of hardware and software. Codec 730 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 730 is depicted as a separate component, codec 730 may be contained or implemented in memory, e.g., non-volatile memory 742.

Non-volatile memory 742 may include read only memory (ROM), programmable ROM (PROM), electrically programmable ROM (EPROM), electrically erasable programmable ROM (EEPROM), flash memory, and/or the like, or any combination of these. Volatile memory 740 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 716, which are in communication with processor unit 704 through system bus 702. In these illustrative examples, the instructions are in a functional form in persistent storage 708. These instructions may be loaded into memory 706 for execution by processor unit 704. Processes of one or more embodiments of the present disclosure may be performed by processor unit 704 using computer-implemented instructions, which may be located in a memory, such as memory 706.

These instructions are referred to as program instructions, program code, computer usable program code, or computer-readable program code executed by a processor in processor unit 704. The program code in the different embodiments may be embodied on different physical or computer-readable storage media, such as memory 706 or persistent storage 708. Program code 718 may be located in a functional form on computer-readable media 720 that is selectively removable and may be loaded onto or transferred to data processing system 700 for execution by processor unit 704. Program code 718 and computer-readable media 720 form computer program product 722 in these examples. In one example, computer-readable media 720 may comprise computer-readable storage media 724 or computer-readable signal media 726.

Computer-readable storage media 724 may include, for example, an optical or magnetic disk that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory, that is connected to data processing system 700. In some instances, computer-readable storage media 724 may not be removable from data processing system 700.

In these examples, computer-readable storage media 724 is a non-transitory, physical or tangible storage device used to store program code 718 rather than a medium that propagates or transmits program code 718. Computer-readable storage media 724 is also referred to as a computer-readable tangible storage device or a computer-readable physical storage device. In other words, computer-readable storage media 724 is media that can be touched by a person.

Alternatively, program code 718 may be transferred to data processing system 700, e.g., remotely over a network, using computer-readable signal media 726. Computer-readable signal media 726 may be, for example, a propagated data signal containing program code 718. For example, computer-readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer-readable signal media 726 for use within data processing system 700. For instance, program code stored in a computer-readable storage medium in a server data processing system may be downloaded over a network from the server to data processing system 700. The computer providing program code 718 may be a server computer, a client computer, or some other device capable of storing and transmitting program code 718.

In some examples, program code 718 may comprise an operating system (OS) 750. Operating system 750, which may be stored on persistent storage 708, controls and allocates resources of data processing system 700. One or more applications 752 take advantage of the operating system's management of resources via program modules 754, and program data 756 stored on storage devices 716. OS 750 may include any suitable software system configured to manage and expose hardware resources of computer 700 for sharing and use by applications 752. In some examples, OS 750 provides application programming interfaces (APIs) that facilitate connection of different type of hardware and/or provide applications 752 access to hardware and OS services. In some examples, certain applications 752 may provide further services for use by other applications 752, e.g., as is the case with so-called "middleware." Aspects of present disclosure may be implemented with respect to various operating systems or combinations of operating systems.

The different components illustrated for data processing system 700 are not meant to provide architectural limitations to the manner in which different embodiments may be implemented. One or more embodiments of the present disclosure may be implemented in a data processing system that includes fewer components or includes components in addition to and/or in place of those illustrated for computer 700. Other components shown in FIG. 10 can be varied from the examples depicted. Different embodiments may be implemented using any hardware device or system capable of running program code. As one example, data processing system 700 may include organic components integrated with inorganic components and/or may be comprised entirely of organic components (excluding a human being). For example, a storage device may be comprised of an organic semiconductor.

In some examples, processor unit 704 may take the form of a hardware unit having hardware circuits that are specifically manufactured or configured for a particular use, or to produce a particular outcome or progress. This type of hardware may perform operations without needing program code 718 to be loaded into a memory from a storage device to be configured to perform the operations. For example, processor unit 704 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 718) may be implemented as hardware, e.g., by specifying an FPGA configuration using a hardware description language (HDL) and then using a resulting binary file to (re)configure the FPGA.

In another example, data processing system 700 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, system bus 702 may comprise one or more buses, such as a system bus or an input/output bus. Of course, the bus system may be implemented using any suitable type of architecture that provides for a transfer of data between different components or devices attached to the bus system. System bus 702 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in system bus 702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

H. Illustrative Combinations and Additional Examples

This section describes additional aspects and features of an illustrative digital imaging system and related methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A digital imaging system comprising:

a plurality of independent pixel devices disposed on a surface exposed to a scene, each of the pixel devices including a photodiode having a limited field of view coupled to a battery and a transmitter antenna, each of the pixel devices configured to transmit information corresponding to light received from the scene by the photodiode using the transmitter antenna; and a base station including one or more storage devices, a processor, and a receiver portion having one or more receiver antennas configured to receive wireless transmissions from the transmitter antennas, such that the receiver portion is in communication with each of the pixel devices.

A1. The system of A0, wherein a plurality of instructions are stored in the one or more storage devices and executable by the processor to convert the combined information of the transmissions received from the plurality of pixel devices into a digital image representing the scene.

A2. The system of A0 or A1, wherein the plurality of independent pixel devices are embedded in a substantially transparent paint covering the surface.

A3. The system of any one of paragraphs A0 through A2, wherein the plurality of independent pixel devices are affixed to the surface by an adhesive.

A4. The system of any one of paragraphs A0 through A3, wherein each of the pixel devices includes a substrate on which the photodiode, the battery, and the antenna are mounted.

A5. The system of A4, wherein the photodiode is recessed in the substrate, such that the substrate limits the field of view of the photodiode.

A6. The system of A5, wherein the field of view is limited to 20 degrees.

B0. A method for capturing image data from a scene, the method comprising:

receiving wirelessly, at a data processing device, light intensity information from a plurality of independent lensless pixel devices embedded in a film (e.g., a transparent and/or solid film) on a surface exposed to a scene (e.g., a real world scene), each of the pixel devices including a photodiode configured to capture the light intensity information, a power source, and an antenna configured to transmit the light intensity information to the data processing device; and converting, using one or more processors of the data processing device to execute an image generation module, the light intensity information from the plurality of pixel devices into a corresponding digital image representing the scene.

B1. The method of B0, further comprising:

calibrating the image generation module by exposing the plurality of pixel devices to one or more controlled scenes.

B2. The method of B1, further comprising:

determining, using the one or more processors, positions of the pixel devices based on the light intensity information expected to be caused by the one or more controlled scenes.

B3. The method of B1, wherein the one or more controlled scenes include a selected image.

B4. The method of B1, wherein the one or more controlled scenes include a positionable light source.

B5. The method of B0, wherein the film comprises a latex paint.

C0. A method for manufacturing an image capturing device, the method comprising:

applying a mixture comprising a plurality of pixel devices dispersed in a clear latex paint to a surface, such that the surface is coated by the mixture, each of the pixel devices including a photodiode configured to capture light intensity information, a power source, and an antenna disposed on a first major surface of a substrate, wherein a second major surface of the substrate is more hydrophilic than the first major surface;

disposing a data processing system having a receiving antenna within an effective transmission range of the antennas of the plurality of pixel devices, such that data from the pixel devices is transmissible from each of the pixel devices to the data processing system.

C1. The method of C0, wherein each of the power sources comprises a rechargeable battery.

C2. The method of any one of paragraphs C0 through C1, further comprising charging the rechargeable battery using the photodiode.

C3. The method of any one of paragraphs C0 through C2, further comprising exposing the surface to a selected image, such that light from the selected image is received by a subset of the pixel devices that have first faces oriented toward the image.

C4. The method of C3, further comprising transmitting the light intensity information from each pixel device of the subset of pixel devices to the data processing system.

C5. The method of C4, wherein the light intensity information corresponds to a rate of change of a charge on the battery.

C6. The method of C4, further comprising calibrating an image generation module of the data processing system using the light-intensity information from each pixel device based on the selected image.

C7. The method of any one of paragraphs C0 through C6, wherein the surface comprises a portion of a wall of a building.

C8. The method of any one of paragraphs C0 through C7, further comprising determining a physical location of each of the pixel devices.

Advantages, Features, and Benefits

The different embodiments and examples of the digital imaging system described herein provide several advantages over known solutions for capturing image data. For example, illustrative embodiments and examples described herein allow a camera to be painted on a wall.

Additionally, and among other benefits, illustrative embodiments and examples described herein allow a camera to be painted onto a portable object or device.

Additionally, and among other benefits, illustrative embodiments and examples described herein allow for improved reliability of computer vision and detection, for example, for a self-driving car.

Additionally, and among other benefits, illustrative embodiments and examples described herein allow a camera to be painted on a picture frame or on the frame of an electronic device. For example, a camera can be painted on the frame of an electronic device so that the electronic device can determine the positions of the eyes of the user.

Additionally, and among other benefits, illustrative embodiments and examples described herein allow for a camera which is unobtrusive and robust. For example, a camera painted on the wall may be very difficult to see and may be very difficult to disable without covering or damaging substantially the entire wall.

No known system or device can perform these functions, particularly in the form of a paintable device. Thus, the illustrative embodiments and examples described herein are particularly useful for turning extended objects and/or oddly shaped objects into cameras. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A digital imaging system comprising:
a plurality of independent pixel devices embedded in a film disposed on a surface exposed to a scene, each of the pixel devices including a photodiode having a limited field of view coupled to a battery and a transmitter antenna, each of the pixel devices configured to transmit information corresponding to light received from the scene by the photodiode using the transmitter antenna; and
a base station including one or more storage devices, a processor, and a receiver portion having one or more receiver antennas configured to receive wireless transmissions from the transmitter antennas, such that the receiver portion is in communication with each of the pixel devices.

2. The system of claim 1, wherein a plurality of instructions are stored in the one or more storage devices and executable by the processor to convert the combined information of the transmissions received from the pixel devices into a digital image representing the scene.

3. The system of claim 1, wherein the film comprises a substantially transparent paint covering the surface.

4. The system of claim 1, wherein each of the pixel devices includes a substrate on which the photodiode, the battery, and the transmitter antenna are mounted.

5. The system of claim 4, wherein the photodiode is recessed in the substrate, such that the substrate limits the field of view of the photodiode.

6. The system of claim 5, wherein the field of view is limited to 20 degrees.

7. A method for capturing image data from a scene, the method comprising:
receiving wirelessly, at a data processing device, light intensity information from a plurality of independent lensless pixel devices embedded in a film on a surface exposed to a scene, each of the pixel devices including a photodiode configured to capture the light intensity information, a power source, and an antenna configured to transmit the light intensity information to the data processing device; and
converting, using one or more processors of the data processing device to execute an image generation module, the light intensity information from the pixel devices into a corresponding digital image representing the scene.

8. The method of claim 7, further comprising:
calibrating the image generation module by exposing the pixel devices to one or more controlled scenes.

9. The method of claim 8, further comprising:
determining, using the one or more processors, positions of the pixel devices based on the light intensity information expected to be caused by the one or more controlled scenes.

10. The method of claim 8, wherein the one or more controlled scenes include a selected image.

11. The method of claim 8, wherein the one or more controlled scenes include a positionable light source.

12. A method for manufacturing an image capturing device, the method comprising:

applying a mixture comprising a plurality of pixel devices dispersed in a clear paint to a surface, such that the surface is coated by the mixture, each of the pixel devices including a photodiode configured to capture light intensity information, a power source, and an antenna disposed on a first major surface of a substrate, wherein a second major surface of the substrate is more hydrophilic than the first major surface; and disposing a data processing system having a receiving antenna within an effective transmission range of the antennas of the pixel devices, such that data from the pixel devices is transmissible from each of the pixel devices to the data processing system.

13. The method of claim 12, wherein each of the power sources comprises a rechargeable battery.

14. The method of claim 13, further comprising charging the rechargeable battery using the photodiode.

15. The method of claim 12, further comprising exposing the surface to a selected image, such that light from the selected image is received by a subset of the pixel devices that have first faces oriented toward the image.

16. The method of claim 15, further comprising transmitting the light intensity information from each pixel device of the subset of pixel devices to the data processing system.

17. The method of claim 16, wherein the light intensity information corresponds to a rate of change of a charge on the power source.

18. The method of claim 16, further comprising calibrating an image generation module of the data processing system using the light intensity information from each pixel device based on the selected image.

19. The method of claim 12, wherein the surface comprises a portion of a wall of a building.

20. The method of claim 12, further comprising determining a physical location of each of the pixel devices.

\* \* \* \* \*